Mar. 6, 1923.

W. E. HOLLAND.
PROTECTIVE COVERING FOR BATTERY CASES.
FILED DEC. 17, 1919.

1,447,782.

Inventor—
Walter E. Holland
by his Attorneys—
Howson & Howson

Patented Mar. 6, 1923.

1,447,782

UNITED STATES PATENT OFFICE.

WALTER E. HOLLAND, OF PHILADELPHIA, PENNSYLVANIA, ASSIGNOR TO PHILADELPHIA STORAGE BATTERY COMPANY, OF PHILADELPHIA, PENNSYLVANIA, A CORPORATION OF PENNSYLVANIA.

PROTECTIVE COVERING FOR BATTERY CASES.

Application filed December 17, 1919. Serial No. 345,622.

*To all whom it may concern:*

Be it known that I, WALTER E. HOLLAND, a citizen of the United States, residing in Philadelphia, Pennsylvania, have invented Protective Coverings for Battery Cases, of which the following is a specification.

In preparing the wooden cases or trays commonly used for holding battery cells, it is customary to provide them with a protective coating that will resist the action of the battery electrolyte. An asphaltum paint is usually employed for this purpose, consisting of natural or artificial asphalt, dissolved in gasoline, naptha, benzine, benzol, or other equivalent solvent, and this paint is usually applied in one or more coats by dipping, brushing or spraying and is allowed to dry before the battery cells are placed in the casing. However, by the time the battery cells have been assembled in the casing, the various connections made and the necessary processes completed which are required to prepare the battery for use, the paint coating is invariably in an unsatisfactory condition, both for service and also as regards its appearance.

It is therefore necessary that the battery casing be given a final finishing coat of paint, both to improve its appearance and for the purpose of covering or closing any scratches or cracks which may have been made in the original coating. This final coat of paint is of great importance, not only because of the necessity of giving the case an attractive, unmarred appearance, but because it is subjected to the action of the acid or other electrolyte, which is spilled, or comes off as spray, from the cells. It must therefore be particularly resistant in order to provide the best possible protection for the wood of the case, and at the same time it must form a tough, elastic coating, which will not readily chip or rub off under conditions of use. Since at the time this final coating is applied, the battery is complete and ready for shipment, it is important from a manufacturing standpoint that it shall dry quickly and with a hard finish in order to avoid the possibility of packing, or other material, sticking to the case.

Figure 1:
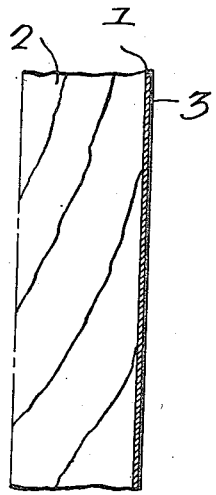
Figure 2:
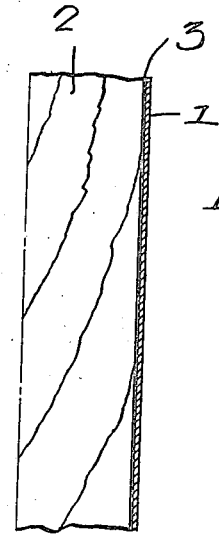
Figure 4:
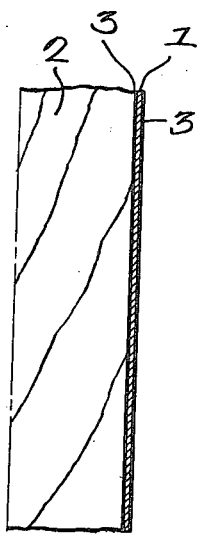
Figure 3:
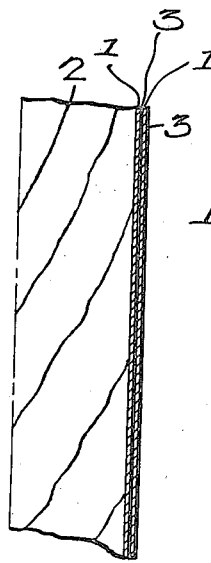

In the drawings herewith Fig. 1 is a fragmentary vertical section, to some extent diagrammatic, illustrative of a part of a wooden case having my protective coating applied thereto; and Figs. 2 to 4 inclusive are fragmentary vertical sections, similar to Fig. 1 illustrating modifications of my invention.

In accordance with my invention, therefore, as shown in Fig. 1, I apply to the wooden cases or trays 2 one or more coats of a protective coating 1, resistant to or substantially unaffected by the electrolyte of the battery, and which as above indicated, may consist of natural or artificial asphalt, dissolved in gasoline, naptha, or other solvent. When this paint has dried, after the battery cells have been assembled in the casing and the battery otherwise prepared for use or shipment, I apply a final or finishing coating 3 which consists of a varnish or paint made with a solvent, such as methyl or ethyl alcohol, which does not affect the original asphalt coat or coatings. As best adapted for this purpose, I preferably employ an alcoholic solution of shellac, or other similar resinous material, or of such synthetic materials as the condensation products of phenol and formaldehyde, to which is added, if desired, lamp black or other pigment for coloring purposes. The alcohol of the shellac solution of the solvent of any other materials employed, neither dissolves nor softens the underlying asphaltum coating, as would be the case if the finishing paint contained gasoline, naptha or other solvent of asphaltum, so that the final coat may be brushed on without danger of working up and disturbing said underlying coat.

Moreover since this solvent for the final coat does not penetrate the first or underlying coat or coatings and since in the case of alcohol, it is of a relatively volatile nature, said finishing or final coat dries quickly and thereafter has no tendency to stick to packing materials or to other cases similarly treated. At the same time, this coat, particularly when shellac is employed, posses the required physical and acid-resisting qualities so that it serves to fully protect the casing from electrolyte accidentally splashed or otherwise given out of the cells, and tends to maintain an attractive appearance.

Obviously, the process may be reversed and, as illustrated in Fig. 2, the shellac coating 3 applied first, with the asphaltum paint 1 as the finishing coat. In this case the primary coating of shellac would not be dissolved, softened, or disturbed in any way by the application of the final coat containing gasoline, naptha or other such solvent. Furthermore, if desired, the coatings may be applied in several alternating layers 1, 3, 1, 3 of asphaltum, paint and shellac, applied as in Fig. 3 or as shown in Fig. 4, when it is required to secure the highest degree of protection against acid.

While I have described my invention as a protective covering for battery cases, it is obviously applicable with equal advantage to other uses in connection with electric batteries, and it is to be noted that by the term asphalt, I desire to include all those carbonaceous pitch-like materials possessing the required properties.

I claim:—

1. A receptacle having thereon a protective coating consisting of at least one layer of asphalt paint, and a layer of shellac, said layers being applied one upon the other.

2. A battery case having thereon a protective coating consisting of a plurality of alternated layers of asphalt paint and a material resistant to the electrolyte of the battery.

3. A receptacle having thereon a protective coating consisting of superposed layers respectively of asphalt paint and resinous material.

4. A receptacle having thereon a protective coating comprising at least one layer of material substantially insoluble in alcohol, and a layer of shellac.

5. A battery case having thereon a protective coating consisting of a layer of material resistant to the electrolyte of the battery, and a layer of shellac, said layers being applied one upon the other.

6. The method which consists in applying at least one coat of asphalt paint and thereafter applying a finishing coat consisting of acid resisting material in a solvent incapable of dissolving the first coat.

7. The method which consists in applying a coat of asphalt paint; allowing said paint to dry; and thereafter applying a layer of paint containing an acid resistant material other than asphaltum, in a solvent in which the latter is insoluble.

8. The method which consists in applying to a body at least one coating of asphalt paint; and thereafter applying to said first coating another coating consisting of shellac in a solvent in which asphalt is insoluble.

9. The method which consists in applying to a body a coating of asphalt paint, and thereafter applying to said first coat a coating of shellac and alcohol.

WALTER E. HOLLAND.